United States Patent
Watabe (10) Patent No.: US 7,791,460 B2
(45) Date of Patent: Sep. 7, 2010

(54) TIRE PRESSURE MONITORING SYSTEM WITH RELIABLE WIRELESS COMMUNICATION BETWEEN WHEEL-BASED TRANSCEIVERS AND VEHICLE BODY-BASED TRANSCEIVER

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 505 days.

(21) Appl. No.: 11/472,558

(22) Filed: Jun. 22, 2006

(65) Prior Publication Data
US 2006/0290485 A1 Dec. 28, 2006

(30) Foreign Application Priority Data
Jun. 22, 2005 (JP) .............................. 2005-181764

(51) Int. Cl.
*B60C 23/02* (2006.01)
(52) U.S. Cl. ....................... 340/442; 340/438; 340/447; 73/146
(58) Field of Classification Search .................. 340/442
See application file for complete search history.

(56) References Cited

U.S. PATENT DOCUMENTS

| | | | |
|---|---|---|---|
| 5,661,651 A * | 8/1997 | Geschke et al. ............... 701/88 |
| 6,278,363 B1 * | 8/2001 | Bezek et al. ................ 340/442 |
| 6,838,985 B2 * | 1/2005 | Ghabra et al. ............... 340/445 |
| 7,173,520 B2 * | 2/2007 | Desai et al. .................. 340/442 |
| 7,212,918 B2 * | 5/2007 | Werback ..................... 701/120 |
| 2004/0008108 A1 * | 1/2004 | Kroitzsch et al. ........... 340/442 |
| 2004/0066288 A1 * | 4/2004 | Okumura ..................... 340/445 |
| 2004/0183664 A1 * | 9/2004 | McClelland et al. ........ 340/442 |
| 2004/0193340 A1 * | 9/2004 | Katou ......................... 701/29 |
| 2005/0280523 A1 | 12/2005 | Watabe |

FOREIGN PATENT DOCUMENTS

JP 2005-190116 7/2005

* cited by examiner

*Primary Examiner*—Toan N Pham
*Assistant Examiner*—Kerri McNally
(74) *Attorney, Agent, or Firm*—Nixon & Vanderhye P.C.

(57) ABSTRACT

According to the present invention, there is provided a tire pressure monitoring system that includes a first transceiver provided on a body of a vehicle and a second transceiver provided on a wheel of the vehicle. The first transceiver transmits a request signal conveying first information. The second transceiver receives the request signal and transmits, in response to receipt of the request signal, a response signal that conveys a tire pressure information indicating the inflation pressure of a tire fitted on the wheel and second information having a predefined relationship with the first information. The first transceiver receives the response signal, identifies the received response signal as being transmitted by the second transceiver based on the fact that the second information is conveyed by the received response signal, and determines the inflation pressure of the tire based on the tire pressure information contained in the identified response signal.

16 Claims, 6 Drawing Sheets

TIRE PRESSURE MONITORING SYSTEM WITH RELIABLE WIRELESS COMMUNICATION BETWEEN WHEEL-BASED TRANSCEIVERS AND VEHICLE BODY-BASED TRANSCEIVER

CROSS-REFERENCE TO RELATED APPLICATION

This application is based on and claims priority from Japanese Patent Application No. 2005-181764, filed on Jun. 22, 2005, the content of which is hereby incorporated by reference into this application.

BACKGROUND OF THE INVENTION

1. Technical Field of the Invention

The present invention relates generally to tire pressure monitoring systems for vehicles and wireless communication systems.

More particularly, the invention relates to a tire pressure monitoring system for a vehicle, in which wheel-based transceivers provide tire pressure information to a vehicle body-based transceiver via reliable wireless communication therebetween.

2. Description of the Related Art

A conventional tire pressure monitoring system for a vehicle includes a plurality of transmitters and a receiver and monitors the inflation pressure of tires of the vehicle via wireless communication between the transmitters and the receiver.

Specifically, in the tire pressure monitoring system, each of the transmitters is mounted on a wheel of the vehicle and includes a pressure sensor working to sense the inflation pressure of a tire fitted on the wheel. Each of the transmitters is configured to transmit a tire pressure signal that conveys tire pressure information on the inflation pressure of the tire sensed by the pressure sensor.

On the other hand, the receiver is mounted on the body of the vehicle. The receiver is configured to receive the tire pressure signals transmitted by the transmitters, determine the inflation pressure of the tires based on the tire pressure information conveyed by the received tire pressure signals, and perform various suitable processes based on the determined inflation pressure of the tires, such as displaying the determined inflation pressure of the tires and warning a flat tire condition of the tires.

Further, in the tire pressure monitoring system, each of the transmitters has identification specific thereto and transmits identification information on the specific identification along with the tire pressure information. Then, the receiver determines whether tire pressure information received thereby is transmitted by one of the transmitters on the vehicle or by a transmitter on another vehicle based on the identification information received thereby along with the tire pressure information.

However, with such a configuration, it is necessary for each of the transmitters to store therein the identification information, thus increasing the memory capacity thereof. Moreover, it is also necessary for each of the transmitters to transmit the identification information along with the tire pressure information, thus increasing the total amount of information required to be transmitted thereby.

Further, with the increased amount of information required to be transmitted, the electric power required for operation of each of the transmitters is accordingly increased. Thus, when the tire pressure monitoring system is of a batteryless type, in which each of the transmitters is supplied with electric power via a radio wave transmitted by a vehicle body-based transmitter (or transceiver) without any battery, the time required for each of the transmitters to receive the radio wave is accordingly increased.

SUMMARY OF THE INVENTION

According to a first aspect of the present invention, a vehicle body-based transceiver is provided on a body of a vehicle to perform wireless communication with a wheel-based transceiver that is provided on a wheel of the vehicle and configured to receive a request signal and transmit a response signal conveying tire pressure information on inflation pressure of a tire fitted on the wheel in response to receipt of the request signal. The vehicle body-based transceiver includes a transmitter, a receiver, and a controller operatively connected to the transmitter and the receiver.

The controller is configured to:
control the transmitter to transmit the request signal,
control the receiver to receive the response signal that conveys the tire pressure information within a predetermined time period from completion of the request signal transmission by the transmitter,
identify the response signal received by the receiver as being transmitted by the wheel-based transceiver based on the fact that the response signal is received within the predetermined time period from completion of the request signal transmission by the transmitter, and
determine the inflation pressure of the tire based on the tire pressure information conveyed by the identified response signal.

According to a second aspect of the present invention, a vehicle body-based transceiver is provided on a body of a vehicle to perform wireless communication with a wheel-based transceiver that is provided on a wheel of the vehicle and configured to receive a request signal conveying first information and transmit, in response to receipt of the request signal, a response signal that conveys tire pressure information on inflation pressure of a tire fitted on the wheel and second information having a predefined relationship with the first information. The vehicle body-based transceiver includes a transmitter, a receiver, and a controller operatively connected to the transmitter and the receiver. The controller is configured to:
control the transmitter to transmit the request signal conveying the first information,
control the receiver to receive the response signal that conveys the tire pressure information and the second information,
identify the response signal received by the receiver as being transmitted by the wheel-based transceiver based on the fact that the second information is conveyed by the response signal, and
determine the inflation pressure of the tire based on the tire pressure information conveyed by the identified response signal.

According to a third aspect of the present invention, a wheel-based transceiver is provided on a wheel of a vehicle to perform wireless communication with an external transceiver. The wheel-based transceiver includes a pressure sensor, a receiver, a transmitter, and a controller.

The pressure sensor works to sense inflation pressure of a tire fitted on the wheel. The receiver works to receive a request signal that is transmitted by the external transceiver and conveys first information. The transmitter works to transmit a response signal that conveys tire pressure information on the inflation pressure of the tire sensed by the pressure sensor and second information having a predefined relationship with the first information. The controller is operatively connected to the pressure sensor, the receiver, and the transmitter. The controller is configured to control the transmitter to transmit the response signal in response to receipt of the request signal by the receiver, thereby allowing the external transceiver to receive the response signal, identify the response signal as being transmitted by the wheel-based transceiver based on the fact that the second information is conveyed by the response signal, and determine the inflation pressure of the tire based on the tire pressure information conveyed by the response signal.

According to a fourth aspect of the present invention, a tire pressure monitoring system is provided which includes a wheel-based transceiver provided on a wheel of a vehicle and a vehicle body-based transceiver provided on a body of the vehicle to perform wireless communication with the wheel-based transceiver.

The wheel-based transceiver includes: a pressure sensor working to sense inflation pressure of a tire fitted on the wheel; a receiver working to receive a request signal that conveys first information; a transmitter working to transmit a response signal that conveys tire pressure information on the inflation pressure of the tire sensed by the pressure signal and a second information having a predefined relationship with the first information; and a controller operatively connected to the pressure sensor, the receiver, and the transmitter and configured to control the transmitter to transmit the response signal in response to receipt of the request signal by the receiver.

The vehicle body-based transceiver includes a transmitter, a receiver, and a controller operatively connected to the transmitter and receiver of the vehicle body-based transceiver. The controller of the vehicle body-based transceiver is configured to:

control the transmitter of the vehicle body-based transceiver to transmit the request signal that conveys the first information, control the receiver of the vehicle body-based transceiver to receive the response signal that conveys the tire pressure information and the second information, identify the response signal received by the receiver of the vehicle body-based transceiver as being transmitted by the wheel-based transceiver based on the fact that the second information is conveyed by the response signal, and determine the inflation pressure of the tire based on the tire pressure information conveyed by the identified response signal.

According to a fifth aspect of the present invention, a wireless communication system is provided which includes a first transceiver and a second transceiver that performs wireless communication with the first transceiver to provide specific information to the first transceiver upon request of the first transceiver. The first and second transceivers are configured such that:

the first transceiver transmits a request signal, the second transceiver receives the request signal, the second transceiver transmits a response signal that conveys the specific information in response to receipt of the request signal, the first transceiver receives the response signal within a predetermined time period from completion of the request signal transmission thereby, the first transceiver identifies the received response signal as being transmitted by the second transceiver based on the fact that the response signal is received within the predetermined time period from completion of the request signal transmission by the first transceiver, and the first transceiver processes the specific information conveyed by the identified response signal as the specific information provided by the second transceiver.

According to a sixth aspect of the present invention, a wireless communication system is provided which includes a first transceiver and a second transceiver that performs wireless communication with the first transceiver to provide specific information to the first transceiver upon request of the first transceiver. The first and second transceivers are configured such that:

the first transceiver transmits a request signal that conveys first information, the second transceiver receives the request signal, the second transceiver transmits, in response to receipt of the request signal, a response signal that conveys the specific information and second information that has a predefined relationship with the first information, the first transceiver receives the response signal, the first transceiver identifies the received response signal as being transmitted by the second transceiver bases on the fact that the second information is conveyed by the received response signal, and the first transceiver processes the specific information conveyed by the identified response signal as the specific information provided by the second transceiver.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-9.

It should be noted that, for the sake of clarity and understanding, identical components having identical functions in different embodiments of the invention have been marked, where possible, with the same reference numerals in each of the figures.

Figure 1:
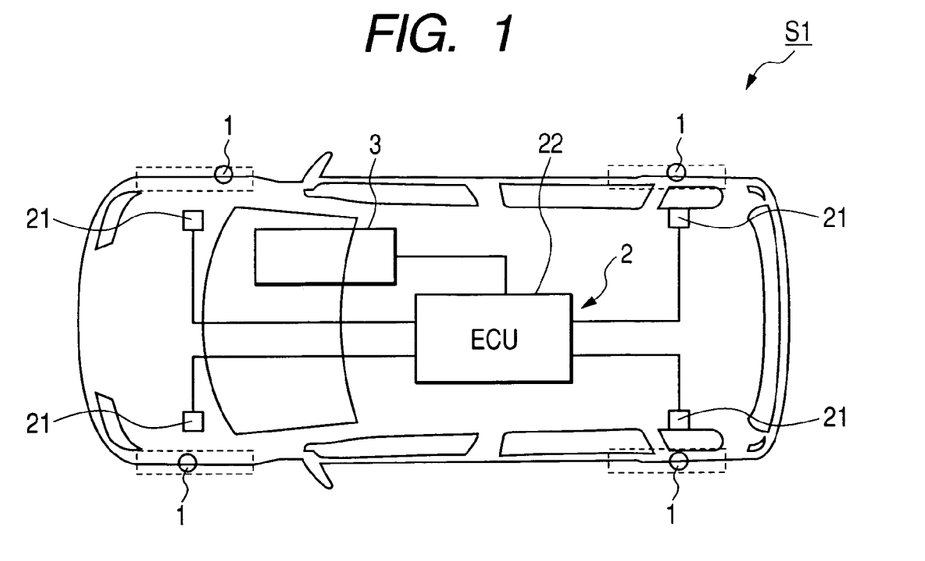
FIG. 1 is a schematic view showing the overall configuration of a tire pressure monitoring system according to an embodiment of the invention.

FIG. 1 shows the overall configuration of a tire pressure monitoring system S1 according to the first embodiment of the invention. The tire pressure monitoring system S1 is installed to a vehicle and configured to monitor the inflation pressure of four tires each of which is fitted on one of four wheels of the vehicle. In addition, it should be noted that the vehicle may have a different number of tires.

As shown in FIG. 1, the tire pressure monitoring system S 1 includes four wheel-based transceivers 1, a vehicle body-based transceiver 2, and an indicating device 3. Further, the body-based transceiver 2 includes four antennas 21 and an Electronic Control Unit (ECU) 22.

Each of the wheel-based transceivers 1 is mounted on one of the four wheels of the vehicle and configured to sense the inflation pressure of a tire fitted on the wheel and transmit a tire pressure signal that indicates the sensed inflation pressure of the tire.

On the other hand, the vehicle body-based transceiver 2 is mounted on the body of the vehicle to perform wireless communication with the wheel-based transceivers 1. The vehicle body-based transceiver 2 is configured to charge the wheel-based transceivers 1 with electricity via radio waves, receive the tire pressure signals transmitted by the wheel-based transceivers 1, and determine the inflation pressure of the tires of the vehicle based on the received tire pressure signals. Further, each of the four antennas 21 is arranged in the vicinity of one of the four wheels of the vehicle, so that the ECU 22 can receive the tire pressure signal transmitted by each of the wheel-based transceivers 1 via a corresponding one of the four antennas 21.

Figure 2:
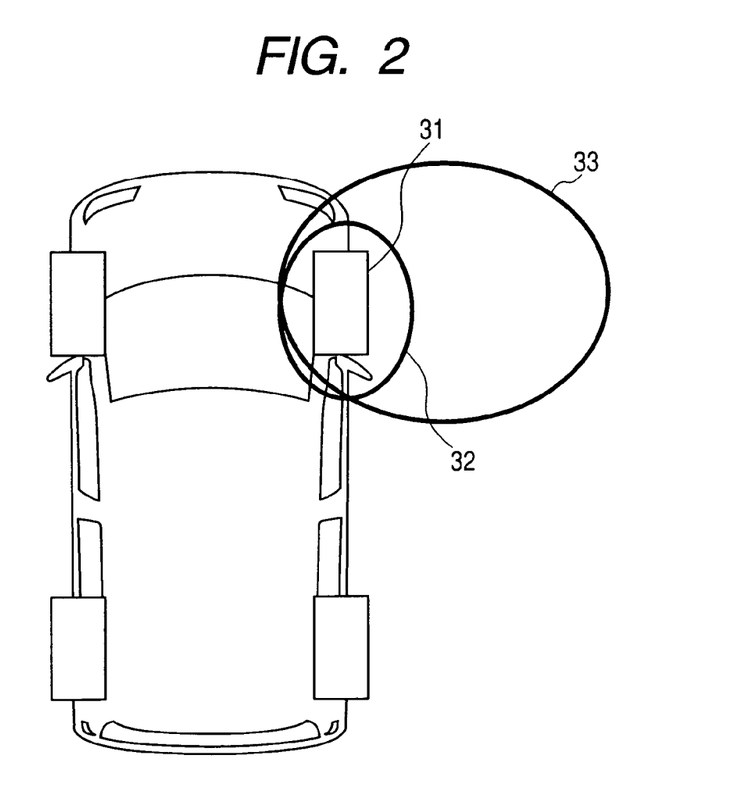
FIG. 2 is a schematic view illustrating a possible area for electric power charge and a possible area for reception for the tire pressure monitoring system of FIG. 1.

FIG. 2 illustrates a possible area 32 for electric power charge and a possible area 33 for reception around one of the four wheels of the vehicle, for example, the front-right wheel 31. Here, the possible area 32 for electric power charge denotes such an area that it is possible for the vehicle body-based transceiver 2 to charge an electrical device located in the area with electricity by transmitting a radio wave via the front-right antenna 21. On the other hand, the possible range 33 for reception denotes such an area that it is possible for the vehicle body-based transceiver 2 to receive a signal transmitted by a transmitter located in the area via the front-right antenna 21. As seen from FIG. 2, the possible area 33 for reception is generally wider than the possible area 32 for electric power charge. Accordingly, it is easy for another vehicle to enter the possible area 33 for reception, and thus it is possible for the vehicle body-based transceiver 2 to receive a signal transmitted by a wheel-based transceiver on another vehicle.

Figure 3:
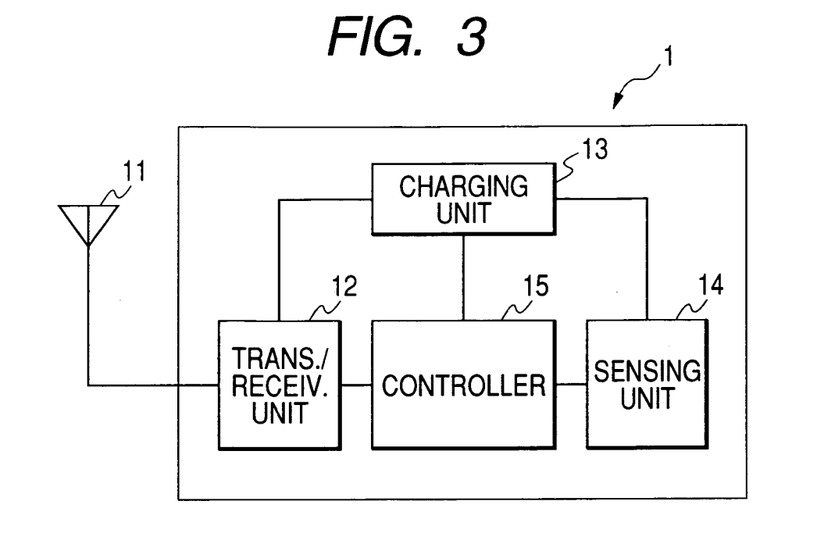
FIG. 3 is a functional block diagram showing the overall configuration of each of wheel-based transceivers in the tire pressure monitoring system of FIG. 1.

FIG. 3 shows the overall configuration of each of the wheel-based transceivers 1. As described above, each of the wheel-based transceivers 1 is configured to operate with electric power supplied from the vehicle body-based transceiver 2 via the radio wave. Such a method of electric power supply via a radio wave is well known in the art, particularly in the field of wireless ID tags.

Specifically, as shown in FIG. 3, each of the wheel-based transceivers 1 functionally includes an antenna 11, a transmitting/receiving unit 12, a charging unit 13, a sensing unit 14, and a controller 15.

The transmitting/receiving unit 12 is configured with, for example, a LC resonant circuit. The transmitting/receiving unit 12 works to receive, via the antenna 11, the radio wave for electric power charge which is transmitted by the vehicle body-based transceiver 2. The radio wave is transmitted at a low frequency of, for example, about 125 kHz. Further, the transmitting/receiving unit 12 works to receive, via the antenna 11, a request signal transmitted by the vehicle body-based transceiver 2 and transmit, via the same, a response signal in response to receipt of the request signal. The response signal is also transmitted at a low frequency of, for example, about 125 kHz. In addition, the radio wave for electric power charge may serve as the request signal to cause the transmitting/receiving unit 12 to transmit the response signal.

The charging unit 13 is configured to be charged with electric power induced by the radio wave and supply the electric power to the other units. For example, the charging unit 13 may be configured with a diode and a capacitor such that the capacitor is charged with the electric power induced by the radio wave. When the charging voltage of the capacitor exceeds a predetermined voltage required for activation of the controller 15. (e.g., 5V), the electric power charged in the charging unit 13 is released from the charging unit 13 and supplied to the sensing unit 14 and controller 15.

The sensing unit 14 is configured with, for example, a diaphragm-type pressure sensor. The sensing unit 14 works to sense the inflation pressure of the tire and output the tire pressure signal that indicates the sensed inflation pressure of the tire.

The controller 15 is configured with a CPU (Central Processing Unit), a ROM (READ Only Memory), a RAM (Random Access Memory), and I/O (Input/Output) devices. The controller 15 is configured to implement predetermined processes in accordance with a program installed in the ROM.

Specifically, after activated by the electric power supply from the charging unit 13, the controller 15 receives the tire pressure signal outputted from the sensing unit 14 and processes it. Then, the controller 15 assembles a frame that contains the processed tire pressure signal and controls the transmitting/receiving unit 12 to transmit the frame.

It should be noted that, in the present embodiment, there is no ID information on the identification of the wheel-based transceiver 1 contained in the frame. In addition, in the case that the sensing unit 14 further includes a temperature sensor and outputs a tire temperature signal indicative of the temperature of air within the tire sensed by the temperature sensor, the tire temperature signal is also contained in the frame along with the tire pressure signal.

The above-described wheel-based transceivers 1 each are fixed to an air valve of a corresponding one of the wheels of the vehicle and at least the sensing unit 14 thereof is placed inside the tire on the wheel so as to be exposed to the air within the tire.

Figure 4:
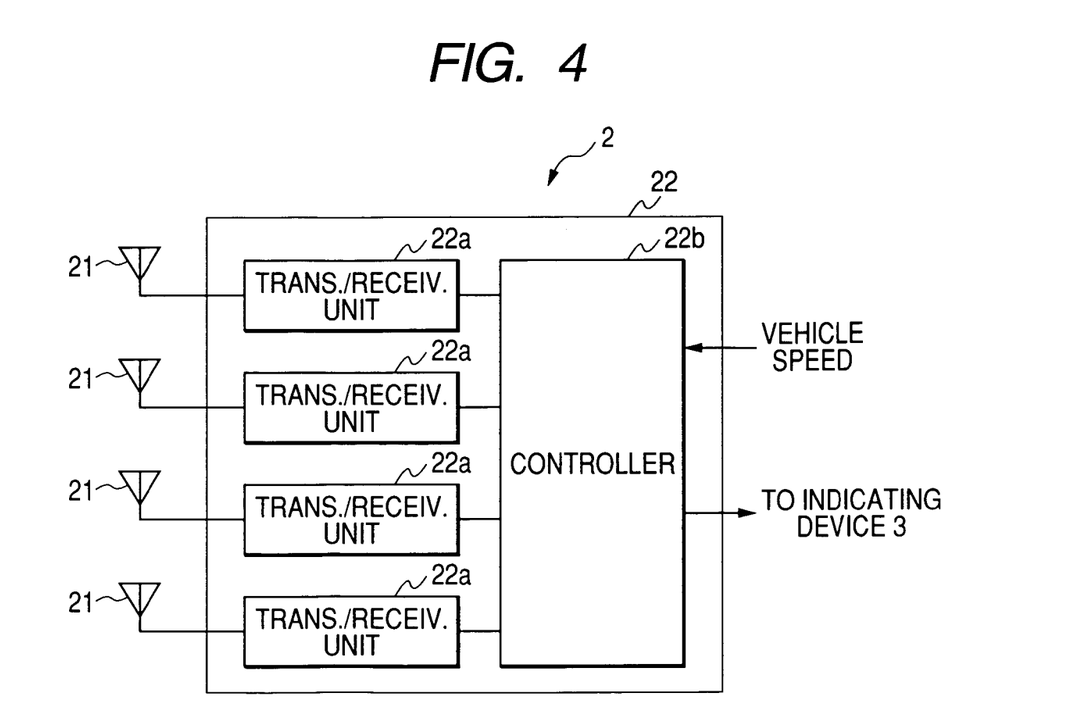
FIG. 4 is a functional block diagram showing the overall configuration of a vehicle body-based transceiver in the tire pressure monitoring system of FIG. 1.

FIG. 4 shows the overall configuration of the vehicle body-based transceiver 2. As described previously, the vehicle body-based transceiver 2 consists of the four antennas 21 and the ECU 22.

Each of the antennas 21 is arranged at a position on the body of the vehicle corresponding to one of the four wheels of the vehicle. For example, each antenna 21 may be positioned away from the corresponding wheel by a given distance and fixed to the body of the vehicle. In the present embodiment, each antenna 21 functions as both a receiving antenna for reception of the radio wave for electric power charge and a transmitting antenna for transmission of the frame that contains the tire pressure signal.

The ECU 22 functionally includes four transmitting/receiving units 22a, each of which is connected to a corresponding one of the four antennas 21, and a controller 22b that is operatively connected to the transmitting/receiving units 22a.

Each of the transmitting/receiving units 22a works to transmit, via the corresponding antenna 21, the radio wave for electric power charge and receive, via the same, the frame transmitted by a corresponding one of the wheel-based transceivers 1.

The controller 22b is configured with a CPU, a ROM, a RAM, and I/O devices. The controller 22b is configured to implement predetermined processes in accordance with a program installed in the ROM thereof.

Specifically, the controller 22b controls each of the transmitting/receiving units 22a to repeatedly transmit the radio wave for electric power charge, thereby charging the corresponding wheel-based transceiver 1 with electricity. Further, the controller 22b controls each of the transmitting/receiving units 22a to receive the frame transmitted by the corresponding wheel-based transceiver 1. Then, the controller 22b identifies whether the received frame is transmitted by one of the wheel-based transceivers 1 or by a wheel-based transceiver on another vehicle. After having identified the frame as being transmitted by one of the wheel-based transceivers 1, the controller 22b further identifies the wheel-on which the wheel-based transceiver 1 having transmitted the frame is mounted based on the position of the antenna 21 via which the frame is received and the transmission time at which the radio wave is transmitted via the antenna 21. After that, the controller determines the inflation pressure of the corresponding tire based on the tire pressure information contained in the received frame and performs various suitable processes based on the determined inflation pressure of the tire. For example, the controller 22b compares the determined inflation pressure of the tire with a predetermined threshold and outputs a warning signal to the indicating device 3 when it is lower than the predetermined threshold.

The indicating device 3 is located, as shown in FIG. 1, in a place that is visible for the driver of the vehicle. The indicating device 3 may be configured with at least one of a warning lamp, a warning display, and a warning buzzer, all of which may be arranged on the instrument panel of the vehicle. The indicating device 3 may be configured to inform the driver of both the inflation pressure and the position of the tire upon receiving the warning signal outputted by the controller 22b.

After having described the overall configuration of the tire pressure monitoring system S 1, an operation thereof will be described hereinafter with reference to FIGS. 5 and 6.

Figure 5:
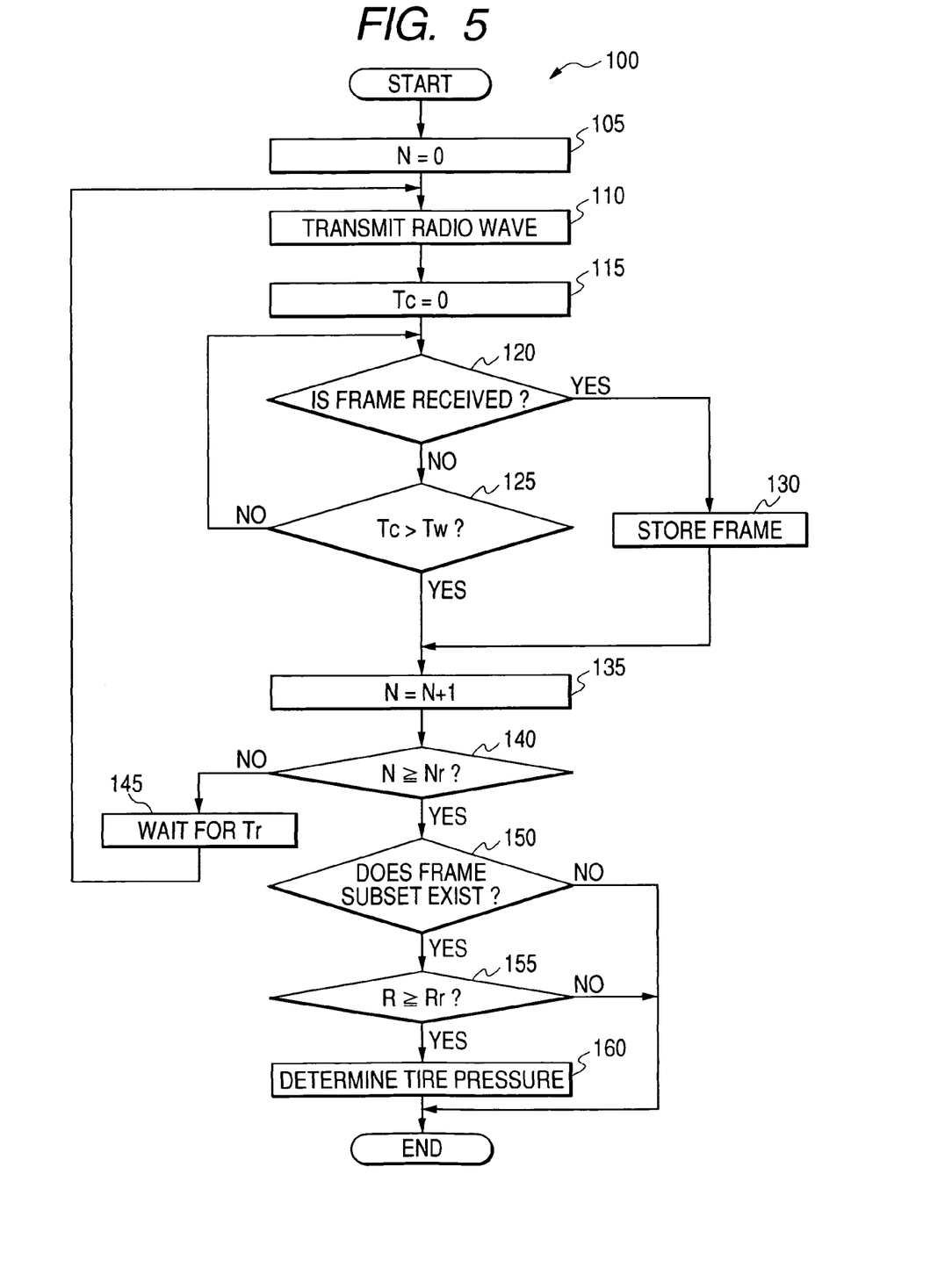
FIG. 5 is a flow chart illustrating a process of the vehicle body-based transceiver in the tire pressure monitoring system of FIG. 1.

FIG. 5 shows a process 100 of the controller 22b of the vehicle body-based transceiver 2 for determination of the inflation pressure of the tires. FIG. 6 illustrates an example of timings for transmission of the radio wave (i.e., the request signal) by the body-based transceiver 2, transmission of the frame (i.e., the response signal) by one of the wheel-based transceivers 1, and transmission of a frame (i.e., an external signal) by a wheel-based transceiver on another vehicle.

The controller 22b performs the process 100 repeatedly upon being supplied with electric power from a battery on the vehicle via a key switch of the vehicle. The process 100 may be performed repeatedly at constant time intervals (e.g., one minute) or at varying time intervals. For example, the time intervals for repeatedly performing the process 100 may be set to decrease with increase in the vehicle speed or with decrease in the inflation pressure of the tires.

Referring to FIG. 5, after start of the process 100, a parameter N in the RAM is set to zero at the step 105, and the radio wave for electric power charge is transmitted, by one of the transmitting/receiving units 22a, at the step 110.

In the present embodiment, as described above, the radio wave for electric power charge also serves as the request signal for causing a corresponding one of the wheel-based transceivers 1 to transmit the frame as the response signal in response to receipt of the request signal.

After completion of the radio wave-transmission at the step 110, the count Tc of a reception timer in the controller 22b is set to zero at the step 115.

At the step 120, a determination is made as to whether a frame containing a tire pressure signal is received by the transmitting/receiving unit 22a that has transmitted the radio wave for electric power charge.

If the determination at the step 120 yields a "YES" answer, then the process 100 proceeds to the step 130, at which the received frame is stored in the RAM and the process 100 goes on to the step 135.

Otherwise, if the determination at the step 120 yields a "NO" answer, then the process 100 goes on to the step 125.

At the step 125, a further determination is made as to whether the count Tc of the reception timer is over a predetermined waiting time Tw, in other words, whether the present time instant is within a predetermined time period from completion of the most recent transmission of the radio wave for electric power charge.

The predetermined waiting time Tw (or the predetermined time period) may be set to have a constant value (e.g., 0.1 second) or a varying value. Further, the predetermined waiting time Tw may be set to vary according to various vehicle or tire conditions, such as the vehicle speed and the inflation pressure of the tires. Otherwise, the predetermined waiting time Tw may be set randomly within a suitable range. However, in any case, the predetermined waiting time Tw (or the predetermined time period) must be long enough for the transmitting/receiving unit 22a having transmitted the radio wave to receive the frame that is transmitted by the corresponding wheel-based transceiver 1 in response to receipt of the radio wave.

If the determination at the step 125 yields a "NO" answer, then the process 100 returns to the step 120.

Otherwise, if the determination at the step 125 yields a "YES" answer, then the process 100 goes on to the step 135.

As above, through the steps 110, 115, 120, 125, and 130, the controller 22b stores in the RAM a frame received by the transmitting/receiving unit 22a only when the frame is received within the predetermined time period from completion of the most recent transmission of the radio wave by that transmitting/receiving unit 22a.

Figure 6:
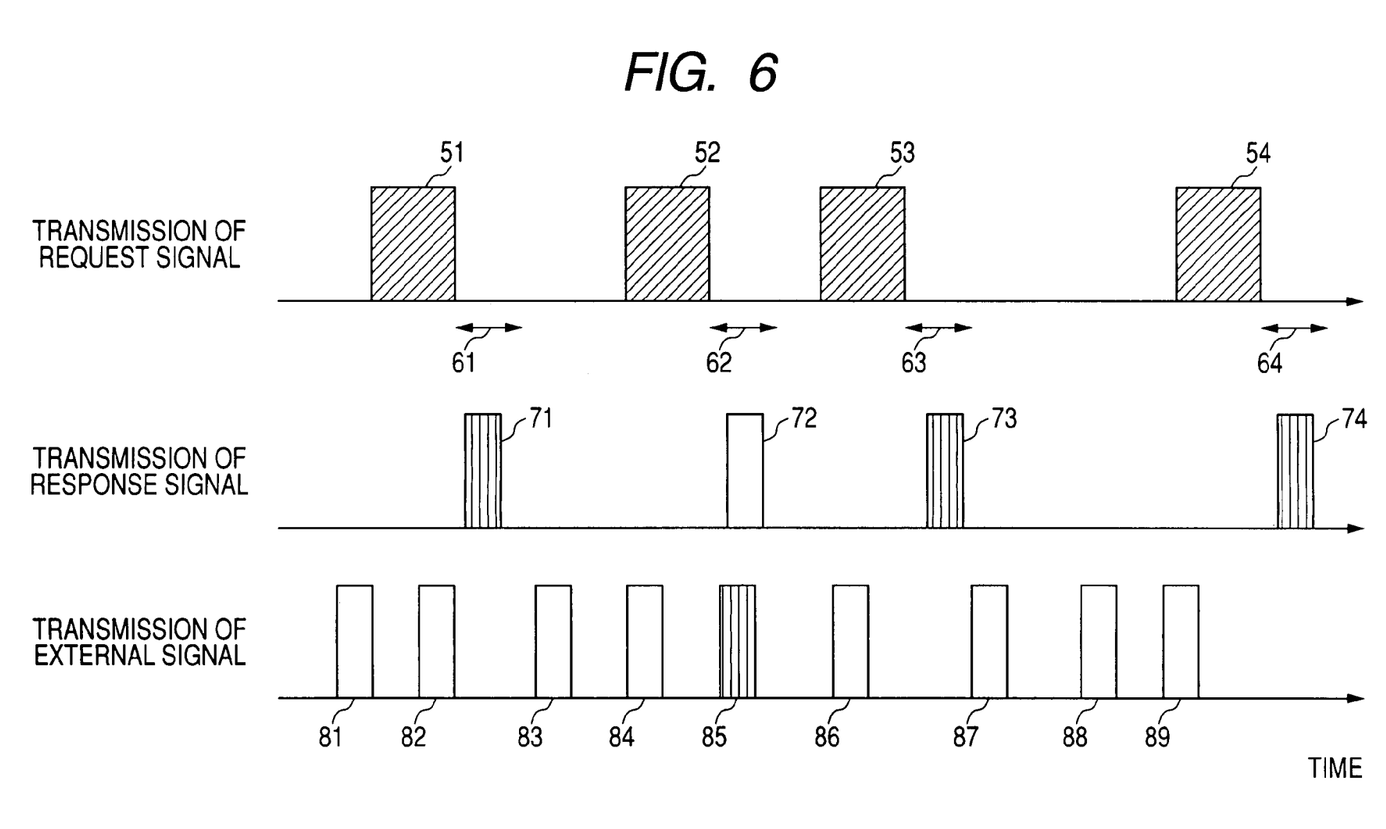
FIG. 6 is a time chart illustrating timings for transmission of a request signal by the body-based transceiver, transmission of a response signal by a corresponding one of the wheel-based transceivers in the tire pressure monitoring system of FIG. 1, and transmission of a signal by an external transceiver.

For example, in FIG. 6, the reference numerals 51-54 denote the radio wave for electric power charge that is repeatedly transmitted by the transmitting/receiving unit 22a as the request signal, the reference numerals 71-74 denote the frame that is repeatedly transmitted by the corresponding wheel-based transmitter 1 as the response signal in response to each receipt of the radio wave, and the reference numerals 81-89 denote a frame that is transmitted from another vehicle and thus forms the external signal relative to the tire pressure monitoring system S1. Hereinafter, for the sake of convenience, plural form is used in description, such as "radio waves 51-54", "the frames 71-74", "the frames 81-89", and "the predetermined time periods 61-63". As seen from FIG. 6, among the frames 71-74 and 81-89, only the frames 71-74 and the frame 85 are received by the transmitting/receiving 22a within the predetermined time periods 61-64 respectively from completion of the transmissions of the radio waves 51-54. Further, the frames 72 and 85 are received by the transmitting/receiving unit 22a almost at the same time. When assuming that the frame 85 has a greater strength in reception than the frame 72, the frame 85 gets preference over the frame 72. Consequently, the controller 22b stores in the RAM only the frames 71, 73, and 74, all of which are transmitted by the corresponding wheel-based transmitter 1, and the frame 85 that is transmitted from another vehicle.

Returning to FIG. 5, at the step 135, the value of the parameter N is increased by 1, and at the succeeding step 140, a determination is made as to whether the parameter N is greater than or equal to a reference number of times Nr.

The reference number of times Nr may be set to have a constant value (e.g., 4 in FIG. 6) or a varying value. Further, Nr may be set to vary according to various vehicle or tire conditions, such as the vehicle speed and the inflation pressure of the tires Otherwise, Nr may be set randomly within a suitable range.

If the determination at the step 140 yields a "NO" answer, then the process 100 goes on to the step 145, at which a time interval Tr is set randomly and after waiting for the time interval Tr, the process 100 returns to the step 110.

Otherwise, if the determination at the step 140 yields a "YES" answer, then the process 100 proceeds to the step 150.

As above, through the steps 135, 140, and 145, the radio wave for electric power charge is repeatedly transmitted Nr times during one implementation of the process 100. Further, the repetitive radio wave transmissions are made at random time intervals. Accordingly, in FIG. 6, the time intervals for the repetitive radio wave transmissions are not constant.

At the step 150, all the frames stored in the RAM are retrieved to form a frame set, and based on the frame set, a determination is made as to whether there exists a frame subset that consists of more than one of the frames in the frame set containing the same tire pressure signal.

In the present embodiment, any two tire pressure signals are identified as the same if the difference between the tire inflation pressures indicated by the two tire pressure signals is within a predetermined range (e.g., ±5 kPa). Further, since the inflation pressures of different tires are hardly to be identical to each other, the tire pressure signals contained in the frames in the same frame subset generally indicate the inflation pressure of the same tire. Accordingly, when there is no other vehicle in the vicinity of the vehicle, the number of frames in the frame subset is generally equal to that in the frame set. However, when there is another vehicle in the vicinity of the vehicle, the number of frames in the frame subset may be different from that in the frame set. For example, in the case of FIG. 6, there are three frames (i.e., the frames 71, 73, and 74) in the frame sub set, while there are four frames (i.e., the frames 71, 73, 74, and 85) in the frame set.

If the determination at the step 150 yields a "NO" answer, then the process 100 directly goes on to the end, without further determining the inflation pressure of the corresponding tire.

Otherwise, if the determination at the step 150 yields a "YES" answer, then the process proceeds to the step 155, at which a further determination is made as to whether a ratio R of the number of frames in the frame subset to that in the frame set is greater than or equal to a reference ratio Rr.

The reference ratio Rr may be set to have a constant value (e.g. 75%) or a varying value. Further, the reference ratio Rr may be set to vary according to various vehicle or tire conditions, such as the vehicle speed and the inflation pressure of the tires. Otherwise, the reference ratio Rr may be set randomly within a suitable range.

If the determination at the step 155 yields a "NO" answer, then the process 100 directly goes on to the end, without further determining the inflation pressure of the corresponding tire.

Otherwise, if the determination at the step 155 yields a "YES" answer, then the process 100 proceeds to the step 160. For example, in the case of FIG. 6, the ratio R is equal to 75% (i.e., ¾), and thus if the reference ratio Rr is set to be not greater than 75%, then the process 100 proceeds to the step 160.

At the step 160, the inflation pressure of the corresponding tire is determined based on the tire pressure signals contained in the frames in the frame subset. The determined inflation pressure of the tire is then compared with the predetermined threshold, and if it is lower than the predetermined threshold, the warning signal is outputted to the indicating device 3 to inform the driver of both the inflation pressure and the position of the tire. In addition, the determined inflation pressure of the tire may be stored in the RAM for comparison with the previously or subsequently determined inflation pressure of that tire.

After the step 160, one implementation of the process 100 is completed. As described above, the process 100 is performed repeatedly. Further, the process 100 is performed for each of the four transmitting/receiving units 22a one after another, thereby determining the inflation pressure of all the four tires of the vehicle.

As descried above, in the tire pressure monitoring system S1 according to the present embodiment, the controller 22b of the vehicle body-based transceiver 2 stores a frame received by one of the transmitting/receiving units 22a only if the frame is received within the predetermined time period from completion of one of the radio wave transmissions by that transmitting/receiving unit 22a.

With this configuration, it is ensured that most of the frames stored by the controller 22b are transmitted by the corresponding wheel-based transceiver 1 on the vehicle, thus ensuring the accuracy in determination of the inflation pressure of the corresponding tire.

Further, in the present embodiment, the controller 22b controls the transmitting/receiving unit 22a to repeatedly transmit the radio wave for electric power charge, determines a frame subset consisting of the frames that are each received by the transmitting/receiving unit 22a within the predetermined time period from completion of one of the radio wave transmissions and contain the same inflation pressure signal, and determines the inflation pressure of the corresponding tire based on the tire pressure signal contained in the frames in the frame sub set.

With this configuration, the probability of the frames in the frame subset being transmitted by the corresponding wheel-based transceiver 1 is very high, thus increasing the accuracy in determination of the inflation pressure of the corresponding tire.

Furthermore, in the present embodiment, the controller 22b determines the inflation pressure of the corresponding tire based on the tire pressure signal contained in the fames in the frame subset only when the ratio R of the number of frames in the frame subset to that in the frame set is greater than or equal to the reference ratio Rr.

With this configuration, the probability of the frames in the frame subset being transmitted by the corresponding wheel-based transceiver 1 is further increased, thus increasing the accuracy in determination of the inflation pressure of the corresponding tire.

Moreover, in the present embodiment, the repetitive radio wave transmissions by the transmitting/receiving unit 22a are made at varying time intervals.

With this configuration, even if the transmitting/receiving unit 22a receives a frame transmitted by an external transceiver within the predetermined time period from completion of one of the radio wave transmissions thereby, it is hardly likely that the 5 completion time of a next one of the radio wave transmissions by the transmitting/receiving unit 22a and the start time of a next one of the frame transmissions by the external transceiver coincide with each other. Consequently, the probability of the frames in the flame subset being transmitted from other vehicles is very low.

Further, in the present embodiment, the repetitive radio wave transmissions by the transmitting/receiving unit 22a are made at random time intervals.

With this configuration, it is hardly likely that the time intervals for the frame transmissions by the corresponding wheel-based transceiver 1 coincide with those for the frame transmissions by an external transceiver. Consequently, the probability of the frames in the flame subset being transmitted from other vehicles is further decreased.

Accordingly, in the tire pressure monitoring system S 1, the vehicle body-based transceiver 2 can reliably distinguish the frames transmitted by the wheel-based transceivers 1 from those transmitted by transmitters or transceivers on other vehicles, without requiring each of the wheel-based transceivers 1 to have identification specific thereto and transmit ID information on the specific identification to the vehicle body-based transceiver 2.

Second Embodiment

This embodiment illustrates an operation of the tire pressure monitoring system S 1, which is different from the operation of the tire pressure monitoring system S1 according to the previous embodiment.

In the present embodiment, the radio wave for electric power charge, which is transmitted from the vehicle body-based transceiver 2 to each of the wheel-based transceivers 1, is configured to convey vehicle ID information. The vehicle ID information indicates identification of the vehicle (or the vehicle body-based transceiver 2) specific thereto. The vehicle ID information is represented by data with a necessary and sufficient size (e.g., 24 bits). Accordingly, the size of the vehicle ID information is less than that of ID information on identification of a wheel-based transmitter or transceiver which generally has a size of 32 bits. The vehicle ID information may be stored in the ROM of the controller 22b of the vehicle body-based transceiver 2 or provided by other control devices on the vehicle, such as an ECU of a smart entry system or a vehicle navigation system.

Figure 7:
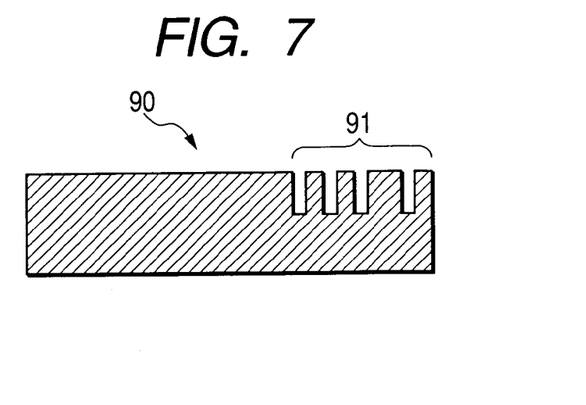
FIG. 7 is a schematic view illustrating the data structure of a radio wave for electric power charge according to an embodiment of the invention.

FIG. 7 schematically shows the data structure of the radio wave for electric power charge, where the radio wave is denoted by a reference numeral 90.

As shown in FIG. 7, in the radio wave for electric power charge, the vehicle ID information is included in a portion 91 that is arranged in the temporally rear place. The temporally front portion of the radio wave 90 is configured for supplying electric power to the wheel-based transceiver 1, so that the wheel-based transceiver 1 can receive the vehicle ID information after activated by the electric power supplied via the radio wave 90.

In addition, as in the previous embodiment, the radio wave for electric power charge also serves as the request signal for causing a corresponding one of the wheel-based transceivers 1 to transmit the frame as the response signal in response to receipt of the request signal.

The transmitting/receiving unit 12 of each of the wheel-based transceivers 1 is configured to receive the radio wave for electric power charge transmitted by the vehicle body-based transceiver 2 and provide the radio wave to both the charging unit 13 and the controlling unit 15.

After activated by the electric power supply from the charging unit 13, the controlling unit 15 controls the transmitting/receiving 12 to transmit the frame that contains the vehicle ID information as well as the tire pressure signal.

Figure 8:
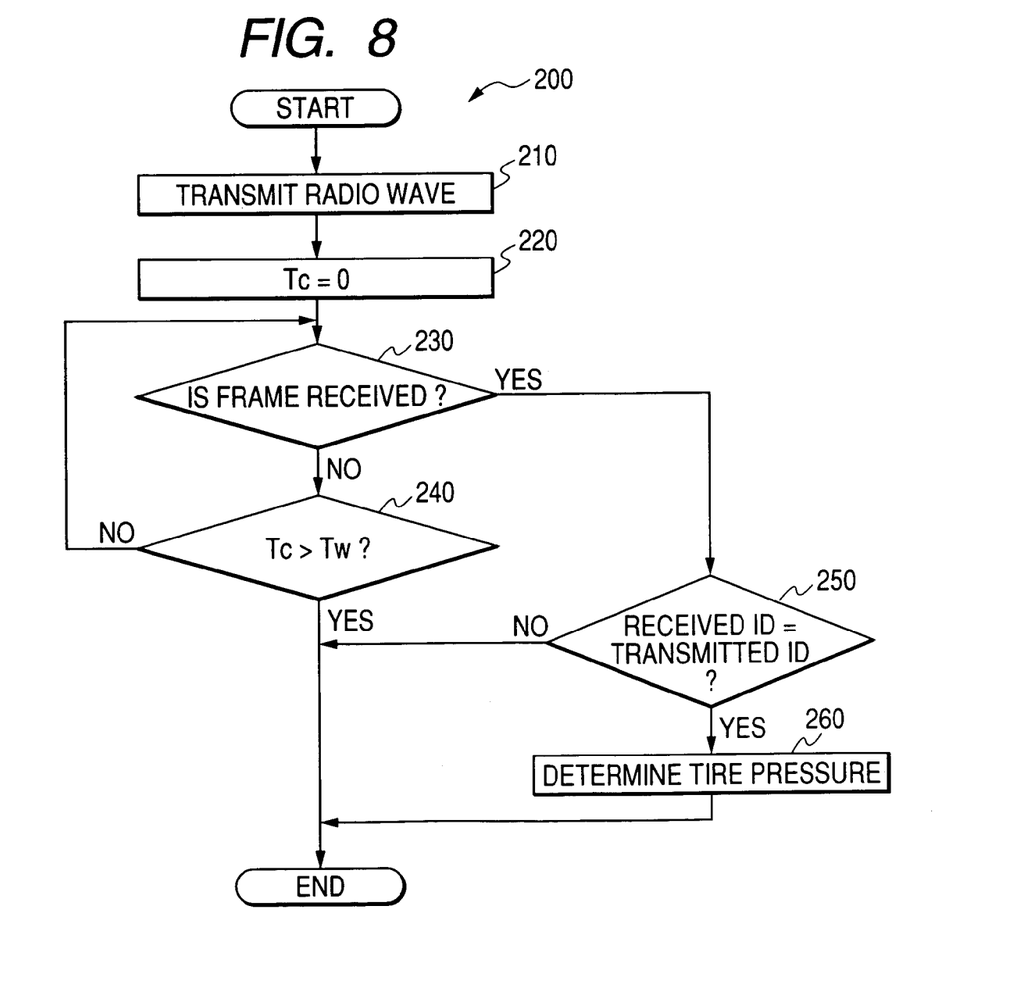
FIG. 8 is a flow chart illustrating another process of the vehicle body-based transceiver in the tire pressure monitoring system of FIG. 1.

FIG. 8 shows a process 200 of the controller 22b of the vehicle body-based transceiver 2 according to the present embodiment.

The controller 22b performs the process 200 repeatedly upon being supplied with electric power from the battery on the vehicle via the key switch of the vehicle. The process 200 may be performed repeatedly at constant time intervals (e.g., one minute) or at varying time intervals. For example, the time intervals for repeatedly performing the process 200 may be set to decrease with increase in the vehicle speed or with decrease in the inflation pressure of the tires.

Referring to FIG. 8, after start of the process 200, the radio wave for electric power charge which conveys the vehicle ID information is transmitted, by one of the transmitting/receiving units 22a, at the step 210.

After completion of the radio wave transmission at the step 210, the count Tc of the reception timer in the controller 22b is set to zero at the step 220.

At the step 230, a determination is made as to whether a frame containing a tire pressure signal and vehicle ID information is received by the transmitting/receiving unit 22a that has transmitted the radio wave for electric power charge.

If the determination at the step 230 yields a "NO" answer, then the process 200 goes on to the step 240. Otherwise, if the determination at the step 230 yields a "YES" answer, then the process 200 proceeds to the step 250.

At the step 240, a further determination is made as to whether the count Tc of the reception timer is over the predetermined waiting time Tw, in other words, whether the present time instant is within the predetermined time period from completion of the most recent transmission of the radio wave for electric power charge.

As in the previous embodiment, the predetermined waiting time Tw (or the predetermined time period) may be set to have a constant value (e.g., 0.1 second) or a varying value. However, in any case, the predetermined waiting time Tw must be long enough for the transmitting/receiving unit 22a having transmitted the radio wave to receive the frame that is transmitted by the corresponding wheel-based transceiver 1 in response to receipt of the radio wave.

If the determination at the step 240 yields a "YES" answer, then the process 200 directly goes on to the end, thereby completing one implementation of the process 200.

Otherwise, if the determination at the step 240 yields a "NO" answer, then the process 200 returns to the step 230.

At the step 250, a further determination is made as to whether the vehicle ID information contained in the frame received by the transmitting/receiving unit 22a coincides with the ID information contained in the radio wave transmitted by that transmitting/receiving unit 22a.

If the determination at the step 250 yields a "NO" answer, then the process 200 directly goes on to the end, thereby completing one implementation of the process 200 without further determining the inflation pressure of the tire.

Otherwise, if the determination at the step 250 yields a "YES" answer, then the process 200 proceeds to the step 260.

At the step 260, the inflation pressure of the tire is determined based on the tire pressure signals contained in the frame. The further processes based on the determined inflation pressure of the tire are the same as in the previous embodiment; therefore, the details thereof are omitted here.

After the step 260, one implementation of the process 200 is completed. As in the previous embodiment, the process 200 is performed repeatedly. Further, the process 200 is performed for each of the four transmitting/receiving units 22a one after another, thereby determining the inflation pressure of all the four tires of the vehicle.

As descried above, in the present embodiment, the controller 22b of the vehicle body-based transceiver 2 controls each of the transmitting/receiving units 22a to receive a frame or frames only within the predetermined time period from completion of one of the radio wave transmissions by that transmitting/receiving units 22a.

With this configuration, the probability of the frame or frames being transmitted by the corresponding wheel-based transceiver 1 on the vehicle is very high, thus ensuring the accuracy in determination of the inflation pressure of the corresponding tire of the vehicle.

Further, in the present embodiment, the radio wave for electric power charge contains the vehicle ID information on the identification of the vehicle, the frame transmitted by each of the wheel-based transceivers 1 contains the vehicle ID information that is received by the wheel-based transceiver 1 via the radio wave, and the vehicle body-based transceiver 2 identifies a frame received thereby as being transmitted by a corresponding one of the wheel-based transceivers 1 only if the received frame contains the vehicle ID information on the identification of the vehicle.

With this configuration, the vehicle body-based transceiver 2 can reliably distinguish the frames transmitted by the wheel-based transceivers 1 from those transmitted by external transmitters or transceivers, without requiring each of the wheel-based transceivers 1 to have identification specific thereto and transmit ID information on the specific identification to the vehicle body-based transceiver 2.

Third Embodiment

This embodiment illustrates an operation of the tire pressure monitoring system S1, which is a combination of the operations of the tire pressure monitoring system S1 according to the first and second embodiments.

In the present embodiment, the operation of the wheel-based transceivers 1 is the same as in the second embodiment. Accordingly, only a process 300 of the controller 22b of the vehicle body-based transceiver 2 according to the present embodiment will be described hereinafter with reference to FIG. 9.

Figure 9:
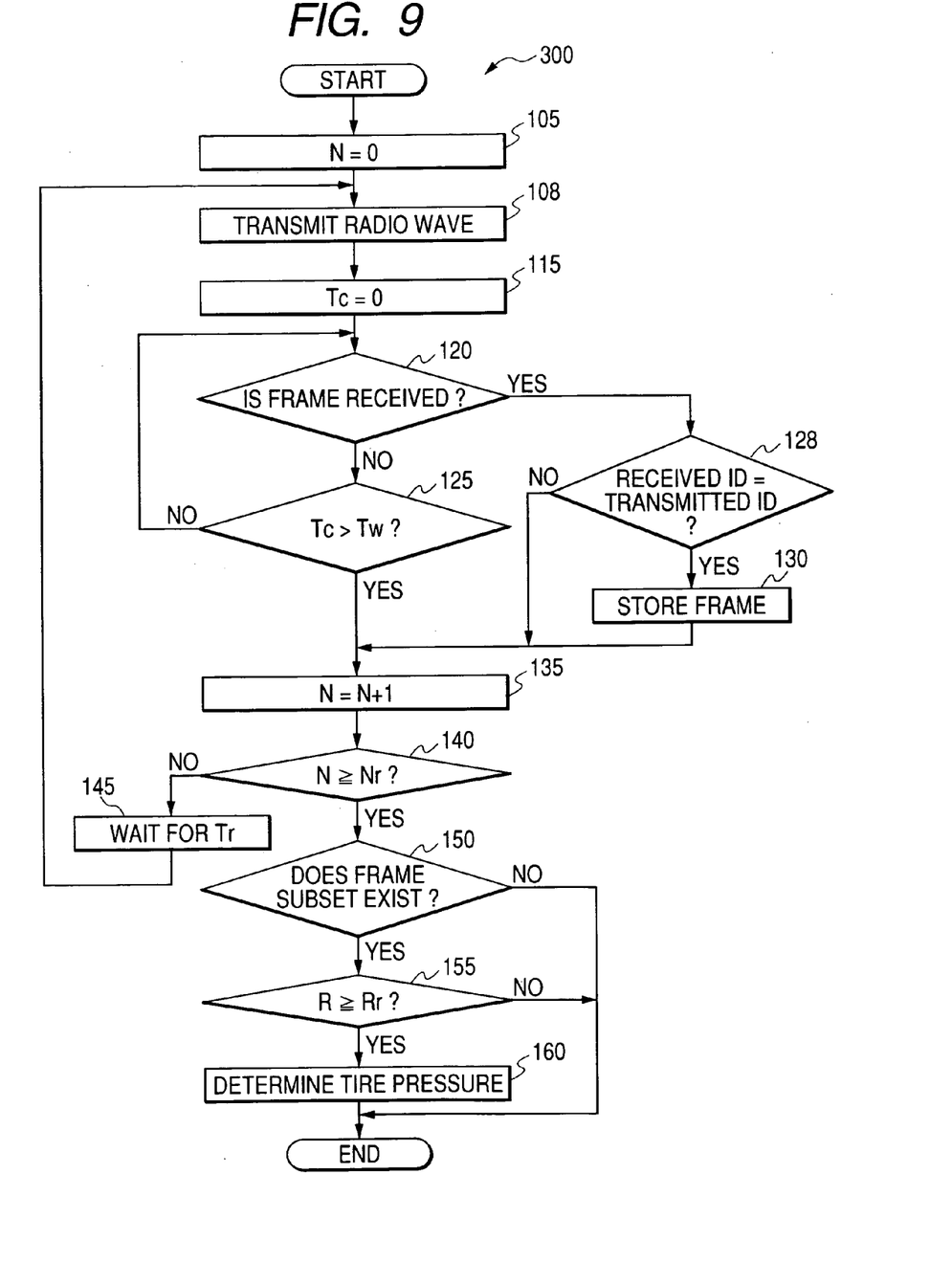
FIG. 9 is a flow chart illustrating yet another process of the vehicle body-based transceiver in the tire pressure monitoring system of FIG. 1.

The controller 22b performs the process 300 repeatedly upon being supplied with electric power from the battery on the vehicle via the key switch of the vehicle. The process 300 may be performed repeatedly at constant time intervals (e.g., one minute) or at varying time intervals. For example, the time intervals for repeatedly performing the process 300 may be set to decrease with increase in the vehicle speed or with decrease in the inflation pressure of the tires.

Referring to FIG. 9, after start of the process 300, the parameter N in the RAM is set to zero at the step 105, and the radio wave for electric power charge which conveys the ID information is transmitted, by one of the transmitting/receiving units 22a, at the step 108.

After completion of the radio wave transmission at the step 108, the count Tc of the reception timer in the controller 22b is set to zero at the step 115.

At the step 120, a determination is made as to whether a frame containing a tire pressure signal and vehicle ID information is received by the transmitting/receiving unit 22a that has transmitted the radio wave for electric power charge.

If the determination at the step 120 yields a "NO" answer, then the process 300 goes on to the step 125. Otherwise, if the determination at the step 120 yields a "YES" answer, then the process 300 proceeds to the step 128.

At the step 125, a further determination is made as to whether the count tc of the reception timer is over the predetermined waiting time tw, in other words, whether the present time instant is within the predetermined time period from completion of the most recent transmission of the radio wave for electric power charge.

As in the previous embodiments, the predetermined waiting time Tw (or the predetermined time period) may be set to have a constant value (e.g., 0.1 second) or a varying value. However, in any case, the predetermined waiting time Tw must be long enough for the transmitting/receiving unit 22a having transmitted the radio wave to receive the frame that is transmitted by the corresponding wheel-based transceiver 1 in response to receipt of the radio wave.

If the determination at the step 125 yields a "YES" answer, then the process 300 proceeds to the step 135.

Otherwise, if the determination at the step 125 yields a "NO" answer, then the process 300 returns to the step 120.

At the step 128, a further determination is made as to whether the vehicle ID information contained in the frame received by the transmitting/receiving unit 22a coincides with the ID information contained in the radio wave transmitted by that transmitting/receiving unit 22a.

If the determination at the step 128 yields a "NO" answer, then the process 300 directly goes on to the step 135.

Otherwise, if the determination at the step 128 yields a "YES" answer, then the process 300 proceeds to the step 130, at which the frame is stored in the RAM and then the process 300 goes on to the step 135.

At the step 135, the value of the parameter N is increased by 1, and at the succeeding step 140, a determination is made as to whether the parameter N is greater than or equal to the reference number of times Nr.

As in the first embodiment, the reference number of times Nr may be set to have a constant value or a varying value. Further, Nr may be set to vary according to various vehicle or tire conditions, such as the vehicle speed and the inflation pressure of the tires. Otherwise, Nr may be set randomly within a suitable range.

If the determination at the step 140 yields a "NO" answer, then the process 300 goes on to the step 145, at which the time interval Tr is set randomly and after waiting for the time interval Tr, the process 300 returns to the step 108.

Otherwise, if the determination at the step 140 yields a "YES" answer, then the process 300 proceeds to the step 150.

At the step 150, all the frames stored in the RAM are retrieved to form a frame set, and based on the frame set, a determination is made as to whether there exists a frame subset that consists of more than one of the frames in the frame set containing the same tire pressure signal.

If the determination at the step 150 yields a "NO" answer, then the process 300 directly goes on to the end, without further determining the inflation pressure of the corresponding tire.

Otherwise, if the determination at the step 150 yields a "YES" answer, then the process proceeds to the step 155, at which a further determination is made as to whether the ratio R of the number of frames in the frame subset to that in the frame set is greater than or equal to the reference ratio Rr.

As in the first embodiment, the reference ratio Rr may be set to have a constant value or a varying value. Further, the reference ratio Rr may be set to vary according to various vehicle or tire conditions, such as the vehicle speed and the inflation pressure of the tires. Otherwise, the reference ratio Rr may be set randomly within a suitable range.

If the determination at the step 155 yields a "NO" answer, then the process 300 directly goes on to the end, without further determining the inflation pressure of the corresponding tire.

Otherwise, if the determination at the step 155 yields a "YES" answer, then the process 300 proceeds to the step 160.

At the step 160, the inflation pressure of the tire is determined based on the tire pressure signals contained in the frames in the frame subset. The further processes based on the determined inflation pressure of the tire are the same as in the first embodiment; therefore, the details thereof are omitted here.

After the step 160, one implementation of the process 300 is completed. As in the previous embodiments, the process 300 is performed repeatedly. Further, the process 300 is performed for each of the four transmitting/receiving units 22a one after another, thereby determining the inflation pressure of all the four tires of the vehicle.

Through performing the above process 300, it is possible to achieve the advantages that are achievable through performing the processes 100 and 200 as described in the previous embodiments.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the second and third embodiments of the invention, the vehicle ID information indicating the identification of the vehicle or the vehicle body-based transceiver 2 is used for identification of the frames transmitted by the wheel-based transceivers 1. Specifically, the vehicle body-based transceiver 2 transmits the radio wave for electric power charge which contains the vehicle ID information; the corresponding wheel-based transceiver 1 transmits the frame that contains the vehicle ID information along with the tire pressure signal; the vehicle body-based transceiver 2 receives the frame and identifies it as being transmitted by the corresponding wheel-based transceiver 1 based on the fact that the vehicle ID information is contained in the frame.

However, instead of the vehicle ID information, any other ID information may also be used for the same purpose. Such ID information may be represented by data with a smaller size of 8 bits or event 4 bits. Further, different ID information may be used for different radio wave transmissions.

Furthermore, the radio wave for electric power charge and the frame may contain different information. For example, the radio wave for electric power charge may contain first information, which may be the vehicle ID information, while the frame contains second information along with the tire pressure signal. However, the first and second information must have a predefined relationship with each other, so that the vehicle body-based transceiver 2 can identify the frame based on the fact that the second information is contained therein. Further, it is required for the corresponding wheel-based transceiver 1 to generate, upon receiving the first information, the second information based on the first information and the predefined relationship. The predefined relationship between the first and second information may be such that the logical sum of the first and second information is equal to a predetermined value or the second information is a predetermined hash value of the first information.

In the previous embodiments of the invention, the radio wave for electric power charge also serves as the request signal for causing the corresponding wheel-based transceiver 1 to transmit the frame as the response signal.

However, instead of the radio wave for electric power charge, any other signal may also be used as the request signal to perform the same task.

In the first and third embodiments of the invention, the repetitive radio wave transmissions by the vehicle body-based transceiver 2 are made at random time intervals.

However, the time intervals for the repetitive radio wave transmissions may also be determined based on a predetermined rule. For example, the time intervals may be determined as a sine function of time.

Further, the repetitive radio wave transmissions may also be made at constant time intervals, provided that the constant time intervals for the vehicle are different from those for any other vehicles.

In the second embodiment of the invention, the vehicle body-based transceiver 2 is configured to receive a frame within the predetermined time period from completion of the radio wave transmission and identify the frame depending on whether the vehicle ID information is contained in the frame.

However, the vehicle body-based transceiver 2 may also be configured to receive a frame at any time after completion of the radio wave transmission and identify the frame depending on whether the vehicle ID information is contained in the frame.

In the first embodiment of the invention, the vehicle body-based transceiver 2 is configured to determine the frame subset and determine the inflation pressure of the corresponding tire based on the tire pressure signal contained in the frames in the frame sub set.

However, the vehicle body-based transceiver 2 may also be configured to determine the inflation pressure of the corresponding tire based on the tire pressure signal contained in any of the frames in the frame set without determining the frame subset. In this case, it is still possible to secure a certain level of accuracy in determination of the inflation pressure of the corresponding tire.

In the previous embodiments, the invention is directed to wireless communication between the wheel-based transceivers 1 and the vehicle body-based transceiver 2 in the tire pressure monitoring system S 1.

However, the invention may also be applicable to any other communication system including two transceivers that perform wireless communication with each other to reliably provide specific information from one to the other.

Such modifications, changes, and improvements within the skill of the art are intended to be covered by the appended claims.

What is claimed is:

1. A vehicle body-based transceiver, which is provided on a body of a vehicle to perform wireless communication with a wheel-based transceiver that is provided on a wheel of the vehicle and configured to receive a request signal conveying first information and transmit, in response to receipt of the request signal, a response signal that conveys tire pressure information on inflation pressure of a tire fitted on the wheel and second information having a predefined relationship with the first information, comprising:
   a transmitter;
   a receiver; and
   a controller operatively connected to the transmitter and the receiver, the controller being configured to:
   control the transmitter to transmit the request signal conveying the first information, control the receiver to receive the response signal that conveys the tire pressure information and the second information,
   identify the response signal received by the receiver as being transmitted by the wheel-based transceiver based on the fact that the second information is conveyed by the response signal, and
   determine the inflation pressure of the tire based on the tire pressure information conveyed by the identified response signal;
   wherein the response signal does not include ID information that specifically identifies the wheel-based transceiver,
   the second information is generated by the wheel-based transceiver based on the first information and the predefined relationship, and
   the second information is identical to the first information.

2. The vehicle body-based transceiver as set forth in claim 1, wherein the first information is vehicle ID information that specifically identifies the vehicle.

3. A vehicle body-based transceiver, which is provided on a body of a vehicle to perform wireless communication with a wheel-based transceiver that is provided on a wheel of the vehicle and configured to receive a request signal conveying first information and transmit, in response to receipt of the request signal, a response signal that conveys tire pressure information on inflation pressure of a tire fitted on the wheel and second information having a predefined relationship with the first information, comprising:
   a transmitter;
   a receiver; and
   a controller operatively connected to the transmitter and the receiver, the controller being configured to:
   control the transmitter to transmit the request signal conveying the first information, control the receiver to receive the response signal that conveys the tire pressure information and the second information,
   identify the response signal received by the receiver as being transmitted by the wheel-based transceiver based on the fact that the second information is conveyed by the response signal, and
   determine the inflation pressure of the tire based on the tire pressure information conveyed by the identified response signal;
   wherein the response signal does not include ID information that specifically identifies the wheel-based transceiver,
   the second information is generated by the wheel-based transceiver based on the first information and the predefined relationship, and
   the logical sum of the first and second information is equal to a predetermined value.

4. A vehicle body-based transceiver, which is provided on a body of a vehicle to perform wireless communication with a wheel-based transceiver that is provided on a wheel of the vehicle and configured to receive a request signal conveying first information and transmit, in response to receipt of the request signal, a response signal that conveys tire pressure information on inflation pressure of a tire fitted on the wheel and second information having a predefined relationship with the first information, comprising:
   a transmitter;
   a receiver; and
   a controller operatively connected to the transmitter and the receiver, the controller being configured to:
   control the transmitter to transmit the request signal conveying the first information, control the receiver to receive the response signal that conveys the tire pressure information and the second information,
   identify the response signal received by the receiver as being transmitted by the wheel-based transceiver based on the fact that the second information is conveyed by the response signal, and
   determine the inflation pressure of the tire based on the tire pressure information conveyed by the identified response signal;
   wherein the response signal does not include ID information that specifically identifies the wheel-based transceiver,
   the second information is generated by the wheel-based transceiver based on the first information and the predefined relationship, and
   the second information is a predetermined hash value of the first information.

5. A wheel-based transceiver, which is provided on a wheel of a vehicle to perform wireless communication with an external transceiver, comprising:
   a pressure sensor working to sense inflation pressure of a tire fitted on the wheel;
   a receiver working to receive a request signal that is transmitted by the external transceiver and conveys first information;
   a transmitter working to transmit a response signal that conveys tire pressure information on the inflation pressure of the tire sensed by the pressure sensor and second information having a predefined relationship with the first information; and
   a controller operatively connected to the pressure sensor, the receiver, and the transmitter, the controller being configured to control the transmitter to transmit the response signal in response to receipt of the request signal by the receiver, thereby allowing the external transceiver to receive the response signal, identify the response signal as being transmitted by the wheel-based transceiver based on the fact that the second information is conveyed by the response signal, and determine the inflation pressure of the tire based on the tire pressure information conveyed by the response signal;
   wherein the response signal does not include ID information that specifically identifies the wheel-based transceiver,
   the second information is generated by the wheel-based transceiver based on the first information and the predefined relationship, and
   the second information is identical to the first information.

6. The wheel-based transceiver as set forth in claim 5, wherein the first information is vehicle ID information that specifically identifies the vehicle.

7. A wheel-based transceiver, which is provided on a wheel of a vehicle to perform wireless communication with an external transceiver, comprising:
- a pressure sensor working to sense inflation pressure of a tire fitted on the wheel;
- a receiver working to receive a request signal that is transmitted by the external transceiver and conveys first information;
- a transmitter working to transmit a response signal that conveys tire pressure information on the inflation pressure of the tire sensed by the pressure sensor and second information having a predefined relationship with the first information; and
- a controller operatively connected to the pressure sensor, the receiver, and the transmitter, the controller being configured to control the transmitter to transmit the response signal in response to receipt of the request signal by the receiver, thereby allowing the external transceiver to receive the response signal, identify the response signal as being transmitted by the wheel-based transceiver based on the fact that the second information is conveyed by the response signal, and determine the inflation pressure of the tire based on the tire pressure information conveyed by the response signal;
- wherein the response signal does not include ID information that specifically identifies the wheel-based transceiver,
- the second information is generated by the wheel-based transceiver based on the first information and the predefined relationship, and
- the logical sum of the first and second information is equal to a predetermined value.

8. A wheel-based transceiver, which is provided on a wheel of a vehicle to perform wireless communication with an external transceiver, comprising:
- a pressure sensor working to sense inflation pressure of a tire fitted on the wheel;
- a receiver working to receive a request signal that is transmitted by the external transceiver and conveys first information;
- a transmitter working to transmit a response signal that conveys tire pressure information on the inflation pressure of the tire sensed by the pressure sensor and second information having a predefined relationship with the first information; and
- a controller operatively connected to the pressure sensor, the receiver, and the transmitter, the controller being configured to control the transmitter to transmit the response signal in response to receipt of the request signal by the receiver, thereby allowing the external transceiver to receive the response signal, identify the response signal as being transmitted by the wheel-based transceiver based on the fact that the second information is conveyed by the response signal, and determine the inflation pressure of the tire based on the tire pressure information conveyed by the response signal,
- wherein the response signal does not include ID information that specifically identifies the wheel-based transceiver,
- the second information is generated by the wheel-based transceiver based on the first information and the predefined relationship, and
- the second information is a predetermined hash value of the first information.

9. A tire pressure monitoring system comprising:
- a wheel-based transceiver provided on a wheel of a vehicle; and
- a vehicle body-based transceiver provided on a body of the vehicle to perform wireless communication with the wheel-based transceiver,
- wherein the wheel-based transceiver includes:
- a pressure sensor working to sense inflation pressure of a tire fitted on the wheel;
- a receiver working to receive a request signal that conveys first information;
- a transmitter working to transmit a response signal that conveys tire pressure information on the inflation pressure of the tire sensed by the pressure signal and a second information having a predefined relationship with the first information; and
- a controller operatively connected to the pressure sensor, the receiver, and the transmitter, the controller being configured to control the transmitter to transmit the response signal in response to receipt of the request signal by the receiver, and
- wherein the vehicle body-based transceiver includes:
- a transmitter;
- a receiver; and
- a controller operatively connected to the transmitter and receiver of the vehicle body-based transceiver, the controller of the vehicle body-based transceiver being configured to:
- control the transmitter of the vehicle body-based transceiver to transmit the request signal that conveys the first information,
- control the receiver of the vehicle body-based transceiver to receive the response signal that conveys the tire pressure information and the second information,
- identify the response signal received by the receiver of the vehicle body-based transceiver as being transmitted by the wheel-based transceiver based on the fact that the second information is conveyed by the response signal, and
- determine the inflation pressure of the tire based on the tire pressure information conveyed by the identified response signal;
- wherein the response signal does not include ID information that specifically identifies the wheel-based transceiver,
- the second information is generated by the wheel-based transceiver based on the first information and the predefined relationship, and
- the second information is identical to the first information.

10. The tire pressure monitoring system as set forth in claim 9, wherein the first information is vehicle ID information that specifically identifies the vehicle.

11. A tire pressure monitoring system comprising:
- a wheel-based transceiver provided on a wheel of a vehicle; and
- a vehicle body-based transceiver provided on a body of the vehicle to perform wireless communication with the wheel-based transceiver,
- wherein the wheel-based transceiver includes:
- a pressure sensor working to sense inflation pressure of a tire fitted on the wheel;
- a receiver working to receive a request signal that conveys first information;
- a transmitter working to transmit a response signal that conveys tire pressure information on the inflation pressure of the tire sensed by the pressure signal and a second information having a predefined relationship with the first information; and
- a controller operatively connected to the pressure sensor, the receiver, and the transmitter, the controller being configured to control the transmitter to transmit the response signal in response to receipt of the request signal by the receiver, and wherein the vehicle body-based transceiver includes:

a transmitter;

a receiver; and a controller operatively connected to the transmitter and receiver of the vehicle body-based transceiver, the controller of the vehicle body-based transceiver being configured to:

control the transmitter of the vehicle body-based transceiver to transmit the request signal that conveys the first information, control the receiver of the vehicle body-based transceiver to receive the response signal that conveys the tire pressure information and the second information, identify the response signal received by the receiver of the vehicle body-based transceiver as being transmitted by the wheel-based transceiver based on the fact that the second information is conveyed by the response signal, and determine the inflation pressure of the tire based on the tire pressure information conveyed by the identified response signal;

wherein the response signal does not include ID information that specifically identifies the wheel-based transceiver, the second information is generated by the wheel-based transceiver based on the first information and the predefined relationship, and the logical sum of the first and second information is equal to a predetermined value.

12. A tire pressure monitoring system comprising:

a wheel-based transceiver provided on a wheel of a vehicle; and a vehicle body-based transceiver provided on a body of the vehicle to perform wireless communication with the wheel-based transceiver, wherein the wheel-based transceiver includes:

a pressure sensor working to sense inflation pressure of a tire fitted on the wheel;

a receiver working to receive a request signal that conveys first information;

a transmitter working to transmit a response signal that conveys tire pressure information on the inflation pressure of the tire sensed by the pressure signal and a second information having a predefined relationship with the first information; and a controller operatively connected to the pressure sensor, the receiver, and the transmitter, the controller being configured to control the transmitter to transmit the response signal in response to receipt of the request signal by the receiver, and wherein the vehicle body-based transceiver includes:

a transmitter;

a receiver; and a controller operatively connected to the transmitter and receiver of the vehicle body-based transceiver, the controller of the vehicle body-based transceiver being configured to:

control the transmitter of the vehicle body-based transceiver to transmit the request signal that conveys the first information, control the receiver of the vehicle body-based transceiver to receive the response signal that conveys the tire pressure information and the second information, identify the response signal received by the receiver of the vehicle body-based transceiver as being transmitted by the wheel-based transceiver based on the fact that the second information is conveyed by the response signal, and determine the inflation pressure of the tire based on the tire pressure information conveyed by the identified response signal;

wherein the response signal does not include ID information that specifically identifies the wheel-based transceiver, the second information is generated by the wheel-based transceiver based on the first information and the predefined relationship, and the second information is a predetermined hash value of the first information.

13. A wireless communication system comprising:

a first transceiver; and a second transceiver performing wireless communication with the first transceiver to provide specific information to the first transceiver upon request of the first transceiver, wherein the first and second transceivers are configured such that:

the first transceiver transmits a request signal that conveys first information, the second transceiver receives the request signal, the second transceiver transmits in response to receipt of the request signal, a response signal that conveys the specific information and second information that has a predefined relationship with the first information, the first transceiver receives the response signal, the first transceiver identifies the received response signal as being transmitted by the second transceiver based on the fact that the second information is conveyed by the received response signal, and the first transceiver processes the specific information conveyed by the identified response signal as the specific information provided by the second transceiver;

wherein the response signal does not include ID information that specifically identifies the second transceiver, the second information is generated by the second transceiver based on the first information and the predefined relationship, and the second information is identical to the first information.

14. The wireless communication system as set forth in claim 13, wherein the first information is vehicle ID information that specifically identifies the vehicle.

15. A wireless communication system comprising:

a first transceiver; and a second transceiver performing wireless communication with the first transceiver to provide specific information to the first transceiver upon request of the first transceiver, wherein the first and second transceivers are configured such that:

the first transceiver transmits a request signal that conveys first information, the second transceiver receives the request signal, the second transceiver transmits, in response to receipt of the request signal, a response signal that conveys the specific information and second information that has a predefined relationship with the first information, the first transceiver receives the response signal, the first transceiver identifies the received response signal as being transmitted by the second transceiver based on the fact that the second information is conveyed by the received response signal, and the first transceiver processes the specific information conveyed by the identified response signal as the specific information provided by the second transceiver;

wherein the response signal does not include ID information that specifically identifies the second transceiver, the second information is generated by the second transceiver based on the first information and the predefined relationship, and the logical sum of the first and second information is equal to a predetermined value.

16. A wireless communication system comprising:

a first transceiver; and a second transceiver performing wireless communication with the first transceiver to provide specific information to the first transceiver upon request of the first transceiver, wherein the first and second transceivers are configured such that:

the first transceiver transmits a request signal that conveys first information, the second transceiver receives the request signal, the second transceiver transmits, in response to receipt of the request signal, a response signal that conveys the specific information and second information that has a predefined relationship with the first information, the first transceiver receives the response signal, the first transceiver identifies the received response signal as being transmitted by the second transceiver based on the fact that the second information is conveyed by the received response signal, and the first transceiver processes the specific information conveyed by the identified response signal as the specific information provided by the second transceiver;

wherein the response signal does not include ID information that specifically identifies the second transceiver, the second information is generated by the second transceiver based on the first information and the predefined relationship, and the second information is a predetermined hash value of the first information.

\* \* \* \* \*